G. R. McDONALD.
CONTINUOUS INDICATING HYDROMETER.
APPLICATION FILED JAN. 29, 1912.
1,071,167.
Patented Aug. 26, 1913.
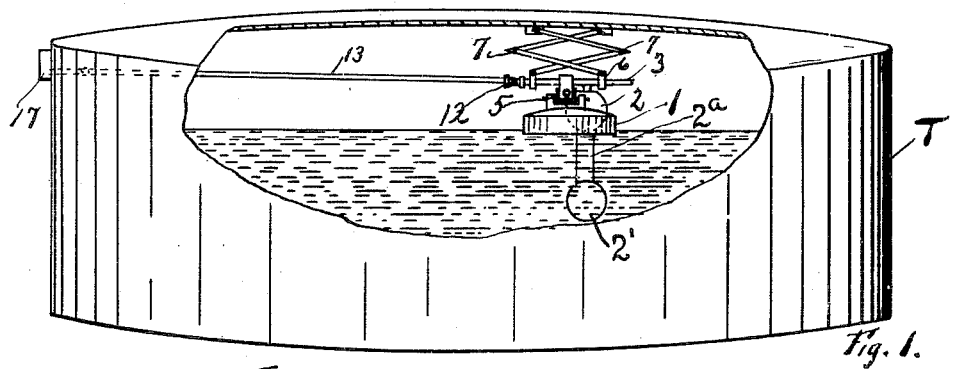
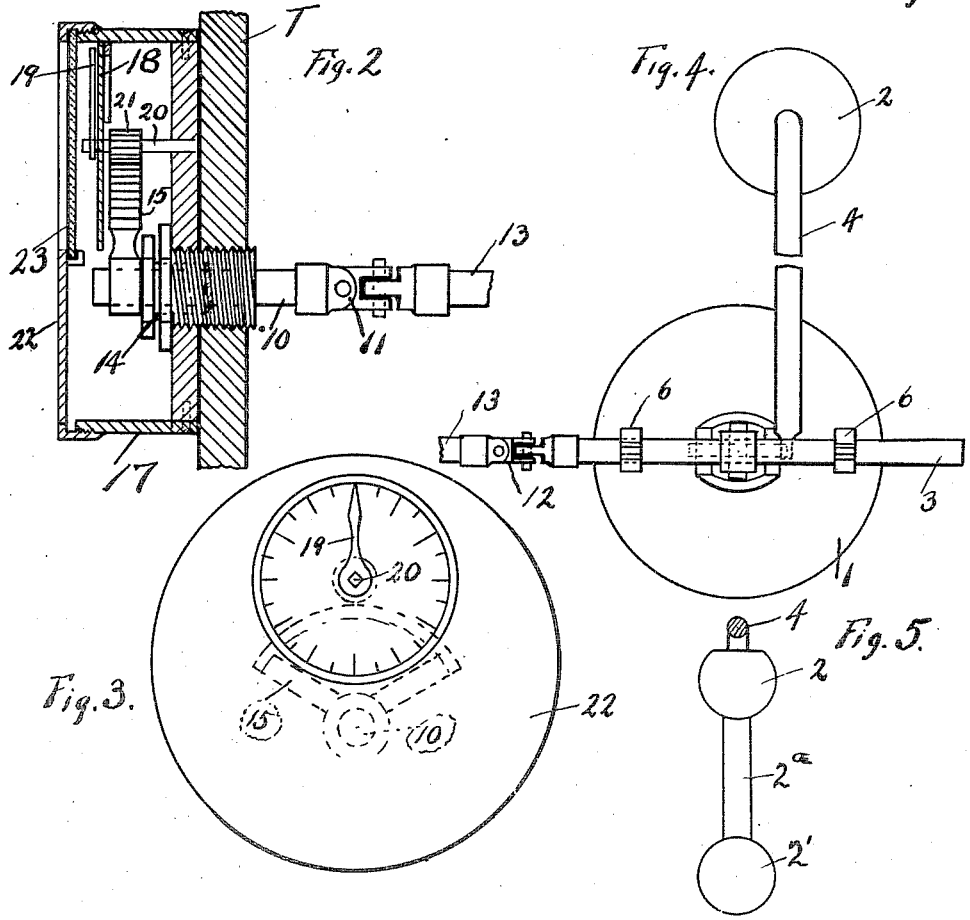
WITNESSES
R. C. Griffin
A. H. Kephart
INVENTOR
G. R. McDonald
BY
Carlos P. Griffin
ATTORNEY

UNITED STATES PATENT OFFICE.

GEORGE ROY McDONALD, OF BERKELEY, CALIFORNIA.

CONTINUOUS INDICATING-HYDROMETER.

1,071,167.

Specification of Letters Patent. Patented Aug. 26, 1913.

Application filed January 29, 1912. Serial No. 674,034.

*To all whom it may concern:*

Be it known that I, GEORGE ROY McDONALD, a citizen of the United States, residing at Berkeley, in the county of Alameda and State of California, have invented a new and useful Continuous Indicating-Hydrometer, of which the following is a specification in such full and clear terms as will enable those skilled in the art to construct and use the same.

This invention relates to a device for ascertaining the specific gravity of a liquid, while this liquid is at a high temperature or in an inaccessible position, where it is difficult to obtain the specific gravity by ordinary means, i. e. by taking a sample in the ordinary manner and using a hydrometer or Westphal balance. The conditions which this device is designed to meet, obtain in many industrial processes, for example, petroleum refining, the sugar industry and many others. This device will allow the attendant in charge of the process to which it is applied, to ascertain the specific gravity of the liquid undergoing the process incident to its manufacture at any time, the device being provided with a constant indicating pointer. Sudden changes in specific gravity may be instantly noted, or by incorporating a recording device with this apparatus, a permanent record of the changes in specific gravity may be obtained.

It is proposed to obtain the specific gravity of a liquid, more particularly when this liquid is at a high temperature or in an inaccessible position, where it is difficult to obtain the specific gravity by ordinary means, by means of the device heretofore mentioned.

In the drawings in which the same numeral of reference is applied to the same portion throughout the several views, Figure 1 is a perspective view of a closed tank having this apparatus applied thereto, a portion of the tank being broken away for the purpose of illustrating the invention. Fig. 2 is a sectional view of a portion of the tank and the indicating apparatus. Fig. 3 is a front elevation of the box containing the operating mechanism and showing the indicating hand and dial. Fig. 4 is a plan view of the two floats used for the purpose of making the indication, and Fig. 5 is a side elevation of the small float for indicating the changes in gravity of the fluid in which it is floating.

The float 1 is of such great area at the normal surface of the liquid with respect to the float 2 that changes in density of the liquid change its height only a small amount. The means for ascertaining this difference in buoyancy of the floats is as follows: The auxiliary float 2 is made of such form as to cause it to vary considerably its position with slight changes in the specific gravity of the fluid in which it is immersed, and to accomplish this it is made with a large immersed portion 2' connected to the portion 2 by means of a tube $2^a$. The result of this is that slight changes in the density of the fluid will cause a considerable movement of the tube $2^a$ in the fluid, while should the fluid be too light at the beginning of the operations the upper portion 2 of the float will prevent the total immersion of said auxiliary float. The main float supports thereover a revoluble shaft 3, said shaft having an arm 4 rigidly attached thereto and preferably at right angles therewith. At the other end of the arm 4 there is attached a float 2, hereinafter called the auxiliary float. The connection between the main float and the shaft 3 is made by means of universal joints 5 to prevent the movement of the liquid due to ebullition, or from other causes, from disturbing the position of the shaft and arm too greatly. The short shaft 3 has two slidable collars 6 thereon, which collars are connected to lazy tongs 7 which are supported from the top of the tank. The object of these lazy tongs is to cause the shaft 3 to always remain horizontal to the surface, even though its position may change considerably. It is to be noted that the lazy tongs arrangement will cause the floats to move up and down in substantially the same vertical plane at all times. Extending through the side of the tank is a horizontal shaft 10, which shaft is connected with the shaft 3 by means of universal joints 11 and 12 and a long rod 13, said universal joints are so placed with respect to each other as to insure the rods of the shafts 3 and 10 moving in unison. The shaft 10 passes through a stuffing box 14 and has a gear segment 15 connected therewith. Surrounding the shaft and gear segment is a box 17, in which is a dial 18. This dial is suitably graduated, and a hand 19 on a small shaft 20 indicates the position of the shaft 10, a small gear 21 being in mesh with the gear segment 15.

The box has a suitable front piece 22 placed thereon and a suitable window 23, through which a dial may be observed.

From the above construction it will be seen that the auxiliary float will move through considerable distances in the vertical plane, while the large float moves through very short distances, thus enabling the observer to very approximately determine the density of the solution or fluid under consideration. The distances referred to in the preceding lines are distances with respect to the surface of the fluid in which the apparatus is floating, mere changes in the level of said liquid not affecting the indicator in any manner whatsoever. In operation the main float preserves the datum plane and may rise or fall without disturbing the indicating hand so long as the density of the fluid remains the same, but when the density of the fluid changes the auxiliary float will rise or fall, as the case may be, and this rise or fall will rotate the shaft 10, which rotation will be multiplied by the segment gear and pinion, so as to be readily discernible upon the indicating hand. It will of course be clear that the main float should be of such considerable area as to be substantially unaffected by small changes of the density of the fluid in which it is submerged.

It is to be observed that the term "area" used in the claims herein has respect to the relative cross sectional area of the two floats.

Having thus described my invention what I claim as new and desire to secure by Letters Patent of the United States, is as follows:

1. The combination of a main float of considerable area, a shaft pivoted thereon and an auxiliary float of small area connected with said shaft for indicating discernible variations in density of a fluid, substantially as described.

2. The combination of a main float of considerable area, a shaft pivoted thereon, a smaller float for indicating variations in density of a fluid, in which both of said floats are floating, and an arm connecting the shaft and smaller float, substantially as described.

3. In a hydrometer, the combination of a main float of considerable area, a shaft pivoted thereon, a smaller float connected with said shaft, a fixed indicating device and a flexible connection between the indicating device and the floats, substantially as described.

4. In a hydrometer, a main float of considerable area, a shaft pivoted thereon, a float of less area connected with said shaft, a fixed indicator, a movable pointer in said indicator and a flexible shaft between the smaller float and the indicator pointer for showing at all times the density of the fluid in which the two floats are placed, substantially as described.

5. In a hydrometer, a float of considerable area, a shaft flexibly connected with said float, means to cause said shaft to remain substantially horizontal with changes in level of the fluid in which the float is placed, a float of considerably smaller area rigidly connected with said shaft for the rotation thereof, a fixed indicator, a movable pointer in said indicator and a flexible connection between said indicator pointer and the aforesaid shaft for showing the density of the fluid in which the floats are placed, substantially as described.

6. In a hydrometer, a float having considerable area, a shaft flexibly supported thereby, means to cause said shaft to remain in substantially the same vertical plane at all times and to maintain a substantially horizontal position, an arm rigidly connected to said shaft and substantially at right angles therewith, a float connected with said arm, a fixed indicator, a movable pointer in said indicator and a flexible connection between said indicator pointer and said shaft for showing changes in density of the fluid in which the floats are placed, substantially as described.

7. In a hydrometer, a closed container, a float of considerable area therein, a shaft flexibly supported by said float, a smaller float rigidly connected with said shaft to rotate the same, a fixed indicator on the outside of the container, a movable pointer in said indicator, a stuffing box, a shaft passing through said stuffing box for the operation of said pointer and a flexible connection between said shaft and the shaft carried by the float for the operation of the indicating device, substantially as described.

8. In a hydrometer, a closed container, a float of considerable area, a shaft flexibly supported thereby, means to maintain said shaft horizontal and in substantially the same vertical plane at all times, an auxiliary float connected with said shaft for the rotation thereof, a fixed indicator on the outside of the container, a movable pointer in said indicator, a stuffing box, a shaft passing through said stuffing box for the operation of said pointer and a flexible connection between said shaft and the shaft carried by said float, substantially as described.

In testimony whereof I have hereunto set my hand this 23" day of January A. D. 1912, in the presence of the two subscribed witnesses.

GEORGE ROY McDONALD.

Witnesses:
C. P. GRIFFIN,
L. H. ANDERSON.